United States Patent
Pialot et al.

(10) Patent No.: US 12,036,757 B2
(45) Date of Patent: Jul. 16, 2024

(54) MANIPULATOR DEVICE HAVING A TRIANGULAR ARCHITECTURE AND INSTALLATION FOR MANUFACTURING TIRES USING SUCH A MANIPULATOR DEVICE FOR PLACING STRIPS

(71) Applicant: Compagnie Generale Des Etablissements Michelin, Clermont-Ferrand (FR)

(72) Inventors: Frederic Pialot, Clermont-Ferrand (FR); Christophe Bessac, Clermont-Ferrand (FR); Alain Sevaille, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 512 days.

(21) Appl. No.: 17/293,386

(22) PCT Filed: Nov. 15, 2019

(86) PCT No.: PCT/FR2019/052728
§ 371 (c)(1),
(2) Date: May 12, 2021

(87) PCT Pub. No.: WO2020/099807
PCT Pub. Date: May 22, 2020

(65) Prior Publication Data
US 2022/0009187 A1     Jan. 13, 2022

(30) Foreign Application Priority Data
Nov. 16, 2018 (FR) ..................................... 1860646

(51) Int. Cl.
*B26D 1/26* (2006.01)
*B26D 1/28* (2006.01)
(Continued)

(52) U.S. Cl.
CPC ............. *B29D 30/46* (2013.01); *B26D 1/265* (2013.01); *B26D 1/285* (2013.01); *B26D 3/003* (2013.01); *B29D 30/28* (2013.01); *B29D 30/3042* (2013.01)

(58) Field of Classification Search
CPC .... B29D 30/46; B29D 30/28; B29D 30/3042; B26D 1/265; B26D 1/285; B26D 3/003
See application file for complete search history.

(56) References Cited

U.S. PATENT DOCUMENTS 9,630,294 B2 * 4/2017 Stocker ................ B23Q 1/5425
2004/0052628 A1 * 3/2004 Thurneysen ......... B23Q 1/4852
                                                    414/730
(Continued)

FOREIGN PATENT DOCUMENTS

CN         1930065 A      3/2007
CN       108136687 A      6/2018
(Continued)

OTHER PUBLICATIONS

Machine translation of DE-19525482-A1, patent document published Jan. 1997.*

*Primary Examiner* — Basil T. Jos
(74) *Attorney, Agent, or Firm* — Dickinson Wright PLLC; Steven C. Hurles

(57) ABSTRACT

The manipulator device includes a pedestal and a carrying mechanism which carries a platform and which forms an articulated triangle comprising: a first arm borne by a first carriage with a first pivot link whose axis forms a first vertex of the triangle, a second arm borne by a second carriage with a second pivot link whose axis forms a second vertex of the triangle, a seat situated at the intersection of the first arm and of the second arm, which forms a third pivot link whose axis is parallel to the first pivot axis and the second pivot axis and forms a third vertex of the triangle. A module is provided for (Continued)

servocontrolling the translational movements of the first carriage and the second carriage with respect to the pedestal. A yaw orientation interface comprises a fourth pivot link, by which the platform is articulated on the seat, both relative to the first arm and relative to the second arm, about a fourth pivot axis which is coaxial to the third pivot axis.

9 Claims, 7 Drawing Sheets

(51) Int. Cl.
    *B26D 3/00*         (2006.01)
    *B29D 30/28*       (2006.01)
    *B29D 30/30*       (2006.01)
    *B29D 30/46*       (2006.01)

(56) References Cited

U.S. PATENT DOCUMENTS

| | | | |
|---|---|---|---|
| 2004/0123694 A1* | 7/2004 | Negri | B23Q 1/5462 |
| | | | 74/490.01 |
| 2019/0337147 A1* | 11/2019 | Freundt | F16H 21/46 |

FOREIGN PATENT DOCUMENTS

| | | | |
|---|---|---|---|
| DE | 19525482 A1 * | 1/1997 | |
| EP | 2692486 A1 | 2/2014 | |
| JP | 2006159443 A | 6/2006 | |
| WO | 02085580 A1 | 10/2002 | |

\* cited by examiner

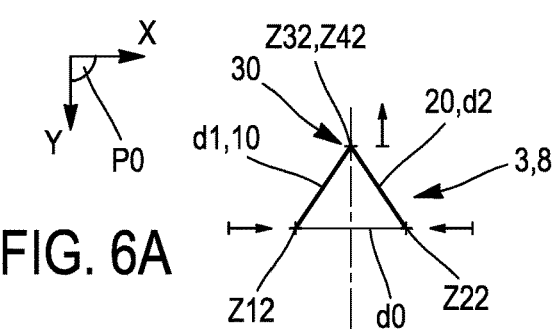
FIG. 6A
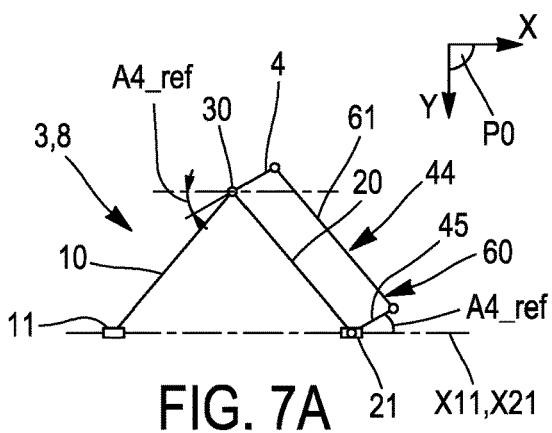
FIG. 7A
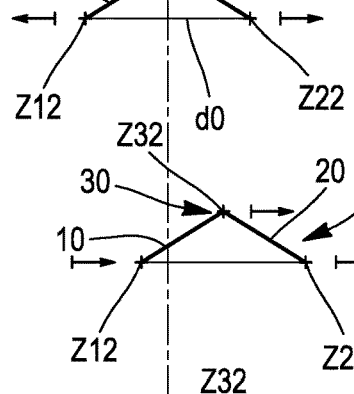
FIG. 6B
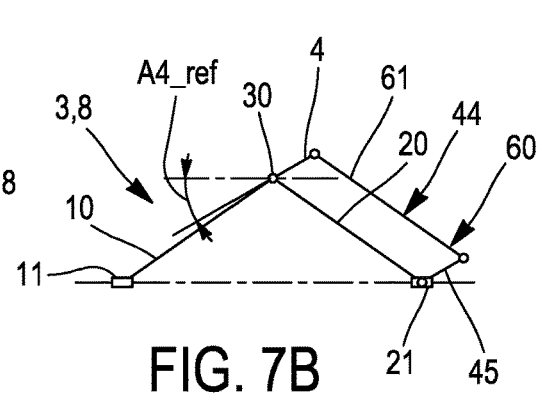
FIG. 7B
FIG. 6C
FIG. 6D
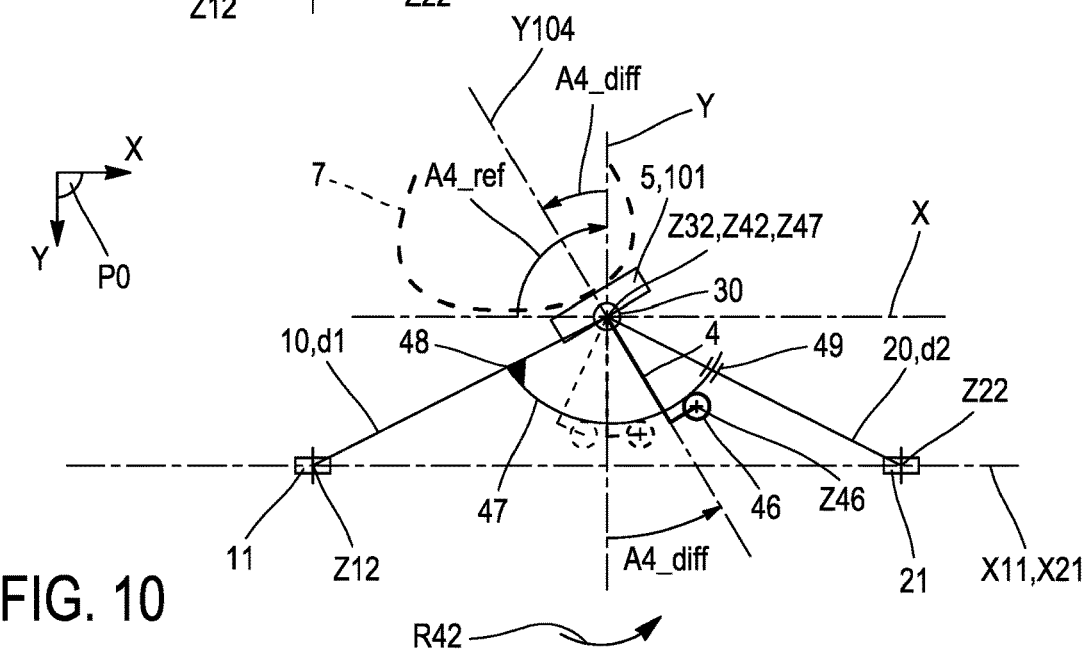
FIG. 10

MANIPULATOR DEVICE HAVING A TRIANGULAR ARCHITECTURE AND INSTALLATION FOR MANUFACTURING TIRES USING SUCH A MANIPULATOR DEVICE FOR PLACING STRIPS

CROSS-REFERENCE TO RELATED APPLICATION

This application claims priority to and the benefit of PCT Patent Application No. PCT/FR2019/052728 filed on 15 Nov. 2019, entitled "MANIPULATOR DEVICE HAVING A TRIANGULAR ARCHITECTURE AND INSTALLATION FOR MANUFACTURING BANDAGES USING SUCH A MANIPULATOR DEVICE FOR PLACING STRIPS," and French Patent Application No. 1860646, filed on 16 Nov. 2018, entitled "MANIPULATOR DEVICE HAVING A TRIANGULAR ARCHITECTURE AND INSTALLATION FOR MANUFACTURING BANDAGES USING SUCH A MANIPULATOR DEVICE FOR PLACING STRIPS".

BACKGROUND

1. Field

The present disclosure relates to the general field of manipulator devices, such as robots, which are used to displace and position, with respect to a pedestal, a platform, or "head", which accommodates an object to be manipulated, such as a tool for example.

The present disclosure relates more particularly to installations for manufacturing reinforcing plies for tires, notably for pneumatic tires, in which a manipulator device is used to lay a series of strips on an assembly support, such as a belt, by successively butt-jointing said strips to one another by their selvedges so as to progressively construct the reinforcing ply.

2. Related Art

A manipulator device is known, notably from the document EP-1 048 445, in which the platform is provided with a pressing roller intended to press a strip against a cylindrical assembly support, and which comprises, to position the pressing roller opposite said cylindrical assembly support, a stack of crossed translation tables moved by a motor which is associated with a worm screw.

Such manipulator devices do however, because of the number and volume of their components, have a large bulk, a significant inertia, and a high construction cost.

Also known, in another field of application that is the machine tool field, are other types of manipulator devices that can be used to displace a tool-holder platform and/or modify the attitude of said platform.

Thus, in particular, the document WO-02/49811 provides for suspending the tool-holder platform by means of a carrying mechanism which comprises several arms which are borne by carriages mounted to be translationally movable on a rail fixed to a pedestal, said arms being arranged in pairs to form, with the platform on the one hand and with their respective carriage of attachment on the other hand, a plurality of articulated parallelograms.

While such an architecture effectively allows a plurality of movements to be performed, it does however present certain drawbacks.

In fact, such carrying mechanisms first of all are relatively complex.

Then, the necessary multiplicity of components, and notably the high number of carriages, of arms, and of articulation members, give such carrying mechanisms a high weight, and therefore a high inertia.

Furthermore, the inevitable clearances in the guiding members and the articulation members necessarily confer on the carrying mechanism a certain undesirable flexibility, which makes controlling the inertia of the mechanism that much more difficult.

Now, the combination of a high inertia and such flexibility notability renders carrying mechanism particularly sensitive to the effects of acceleration, and more particularly to a jerking phenomenon induced by a component called "jerk vector" or "jerk", which corresponds to a first derivative, with respect to time, of the acceleration vector.

Consequently, such known carrying mechanisms can be subject, by necessity and notably to preserve their life span, to certain restrictions concerning the accelerations implemented, concerning their speed of execution, and therefore concerning the maximum production rate that they allow to be achieved.

SUMMARY OF THE INVENTION

The objects ascribed to the disclosure consequently aim to remedy the abovementioned drawbacks and to propose a manipulator device which, while retaining multipurpose movement, is accurate, relatively simple and compact, which has a high rigidity and a relatively low inertia, and which consequently offers low jerk sensitivity and therefore allows particularly high accelerations and production rates to be achieved without damage.

The objects ascribed to the disclosure are achieved by means of a manipulator device which comprises a pedestal and a carrying mechanism which is supported by said pedestal and which carries a platform intended to receive an object to be manipulated, such as a tool, said manipulator device being wherein the carrying mechanism forms an articulated triangle which comprises:
- a first arm which is borne by a first carriage guided in translation on the pedestal, and which is articulated with said first carriage on a first pivot link about a first pivot axis which forms a first vertex of the articulated triangle,
- a second arm which is borne by a second carriage, distinct from the first carriage and guided in translation on the pedestal, and which is articulated with said second carriage on a second pivot link about a second pivot axis, which is parallel to the first pivot axis and forms a second vertex of the articulated triangle,
- a seat, which offers a support to the platform and which corresponds to an intersection of the first arm and of the second arm, an intersection at which said first and second arms are articulated with respect to one another on a third pivot link, about a third pivot axis which is parallel to the first pivot axis and to the second pivot axis and which forms a third vertex of the articulated triangle,
- a servocontrol module which controls, on the one hand, a first motor, specific to the first carriage, and, on the other hand, a second motor, specific to the second carriage and distinct from the first motor, so as to be able to distinctly servocontrol the respective translational movements of the first carriage and the second carriage with respect to the pedestal, in order to be able to modify the position of the seat with respect to the pedestal, a yaw orientation interface which comprises a fourth pivot link, called "yaw differential pivot", by which the platform is articulated on the seat, both relative to the first arm and relative to the second arm, by a yaw rotation movement called "yaw differential movement", about a fourth pivot axis called "yaw differential axis" which is coaxial to the third pivot axis.

Advantageously, the proposed triangular structure, which limits the number of articulations and the number of moving members, makes it possible to reconcile lightness and rigidity.

In practice, the inventors have found that a manipulator device according to the disclosure could achieve, without damage and without loss of accuracy, considerable accelerations, greater than 10 G (ten times the acceleration of gravity), even equal to 100 G (one hundred times the acceleration of gravity), and therefore very high execution speeds and production rates.

Furthermore, the choice of a triangular structure in which it is possible to freely control the displacement of two of the vertices, by virtue of the individual motorization of the corresponding first and second carriages, makes it possible, depending on by how much the distance between the first and second carriages is increased, how much the distance between the first and second carriages is reduced, and/or how much the first and second carriages are jointly displaced pursuant to a common displacement component, to position the third vertex at any point of a cartesian reference frame attached to a reference plane normal to the first, second and third pivot axes, and therefore to make the seat, and therefore more globally the platform which is attached to said seat, follow any desired trajectory in said cartesian reference frame, which renders the manipulator device both multipurpose and accurate.

Advantageously, the disclosure additionally provides a yaw orientation interface which allows, whatever the position that the carriages and the arms confer on the seat in the reference plane, and more particularly whatever the position that the carriages and the arms confer on the third pivot axis in said reference plane, the platform to be freely oriented by yaw about said third pivot axis, according to a differential degree of freedom of yaw rotation, which is not, in itself, dependent on the respective angular orientations of the first and second arms in said reference plane.

It is thus possible to adjust the yaw orientation of the platform, in particular the absolute yaw orientation of said platform with respect to the pedestal in an absolute reference frame attached to said pedestal, independently, without being constrained by the position that the third pivot axis occupies in the reference plane or by the corresponding yaw orientation of one or other of the first and second arms.

In particular, by virtue of the yaw orientation interface according to the disclosure, it will be possible, if so desired, to confer on the platform a chosen yaw orientation, considered in an absolute manner in the reference frame attached to the pedestal, then retain, by virtue of a suitable compensation, a constant yaw orientation of the platform with respect to the pedestal, even when the seat, and therefore said platform, will be displaced freely in the cartesian reference frame of the reference plane, by means of the carriages.

Likewise, by virtue of this same yaw orientation interface according to the disclosure, it will be possible, if so desired, to modify the yaw orientation of the platform once the seat has been brought to the desired cartesian position in the reference plane, and/or during the displacement of the seat in the reference plane, for example to adapt the yaw orientation of the platform so as to tangentially follow an incurved surface, such as, for example, the incurved, concave or else preferably convex surface of a toroidal assembly support, so that the tool, and more particularly the axis of the strip-laying pressing roller, which is carried by said platform, is presented at any moment according to an orientation which is substantially tangential to the point of the surface considered, and thus exerts a bearing force that is substantially normal to said surface to apply said strip.

Finally, the simplicity of the triangular structure, in particular if this structure is associated with certain particular geometries, for example a rectilinear guiding of the first carriage and of the second carriage on a common guiding axis and/or arms which are chosen of identical lengths to form an isosceles triangular arrangement, will make it possible to produce any trajectory of the seat, and more globally any freely chosen trajectory of the platform, by means of servocontrol laws that are relatively simple, and therefore not very computation resource-intensive.

It will be noted that the manipulator device according to the disclosure advantageously forms a rotor of "cartesian robot" type, that is particularly accurate, simple, lightweight and stable, which follows a system of cartesian coordinates and which therefore allows a rapid and accurate positioning of the seat, and more globally of the platform, in the absolute cartesian reference frame attached to the reference plane and to the pedestal, whatever the position or the trajectory targeted, by comparison with a robot of anthropomorphic type which would comprise a single articulated arm with multiple axes (of the six-axis robot type, for example), and which could thereby be more subject, in certain circumstances, to phenomena of inertia or of lack of accuracy.

BRIEF DESCRIPTION OF THE DRAWINGS

Other objects, features and advantages of the disclosure will become apparent in more detail on reading the following description, and using the attached drawings, provided in a purely illustrative and nonlimiting manner, in which:

FIGS. 6A, 6B, 6C, 6D illustrate, by schematic bottom views, in projection in a reference plane which is normal to the first, second and third pivot axes, examples of movements of the seat which can be obtained by displacing the first carriage and/or the second carriage.

FIGS. 7A and 7B illustrate, by schematic bottom views, in a reference plane normal to the third pivot axis, the principle of operation of a compensating system which can be used by a manipulator device according to the disclosure and which allows the absolute yaw orientation of the platform with respect to the pedestal to be retained during movements of the first and second carriages, in which said compensating system uses an articulated parallelogram.

FIG. 10 illustrates, by a schematic bottom view, in a reference plane normal to the third pivot axis, the principle of an active modification of the yaw orientation of the platform with respect to the seat, and more globally of an active modification of the absolute yaw orientation of the platform with respect to the pedestal, by means of a yaw orientation motor with which the yaw orientation interface is equipped, here in particular to offer up a tool carried by the platform tangentially to the convex surface of a convex toroidal assembly support.

DETAILED DESCRIPTION OF THE ENABLING EMBODIMENTS

Figure 1:
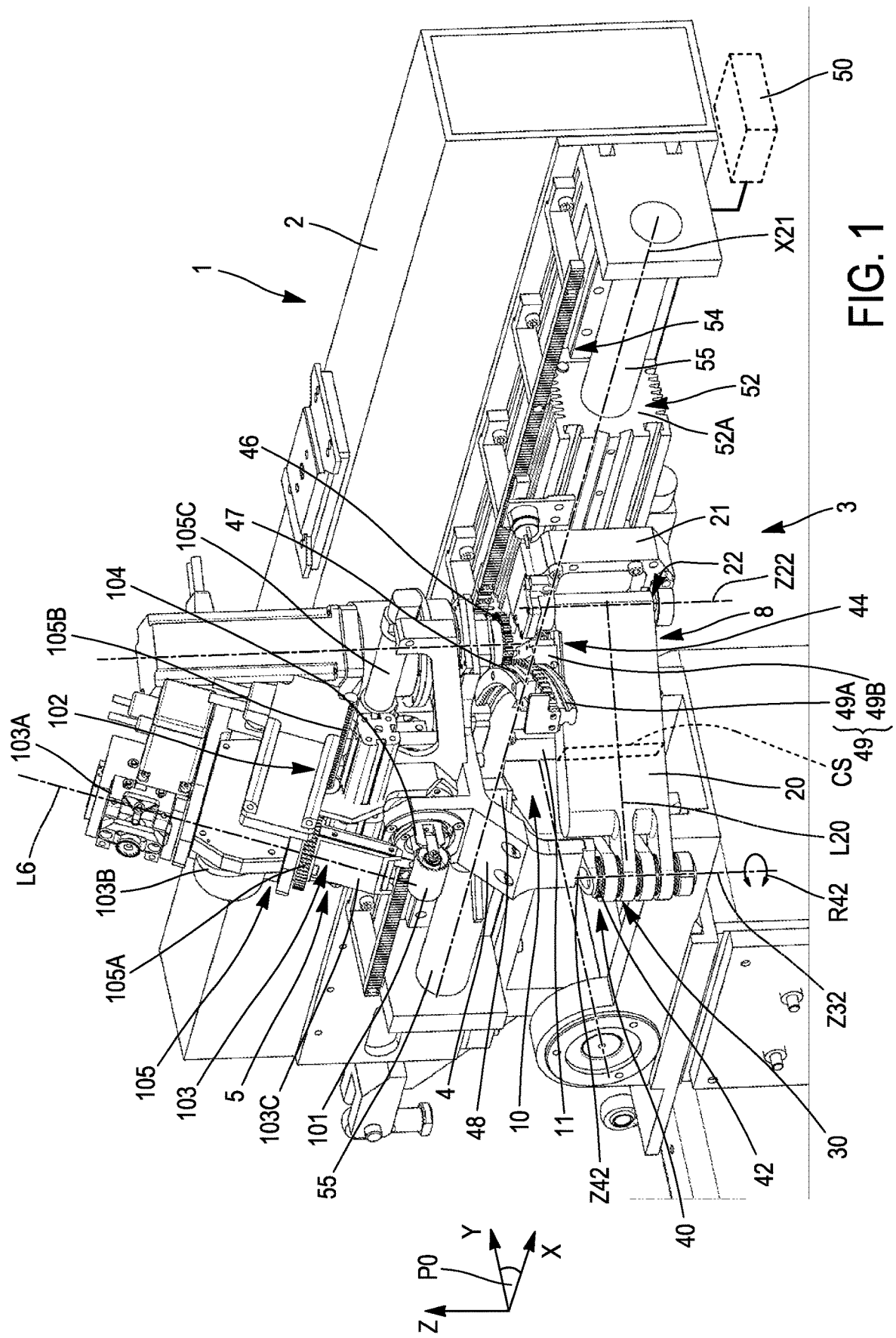
FIG. 1 illustrates, by a perspective view, an example of manipulator device according to the disclosure.

The present disclosure relates to a manipulator device 1 which comprises a pedestal 2, and a carrying mechanism 3. Said carrying mechanism 3 is supported by said pedestal 2 and carries a platform 4 intended to receive an object to be manipulated 5.

The pedestal 2 can preferably constitute a fixed frame, which may for example be placed on a building element, such as the floor, even be fixed to said building element for greater stability.

The object to be manipulated 5 can for example be a piece to be worked, or a tool, notably a laying tool 5 which is arranged to convey and lay one or more strips 6 on an assembly support 7, and more particularly to successively butt joint on said assembly support 7 several of said strips 6 to one another by their respective selvedges.

For convenience of the description, the object to be manipulated 5 and laying tool can be likened to one another hereinbelow.

Figure 4:
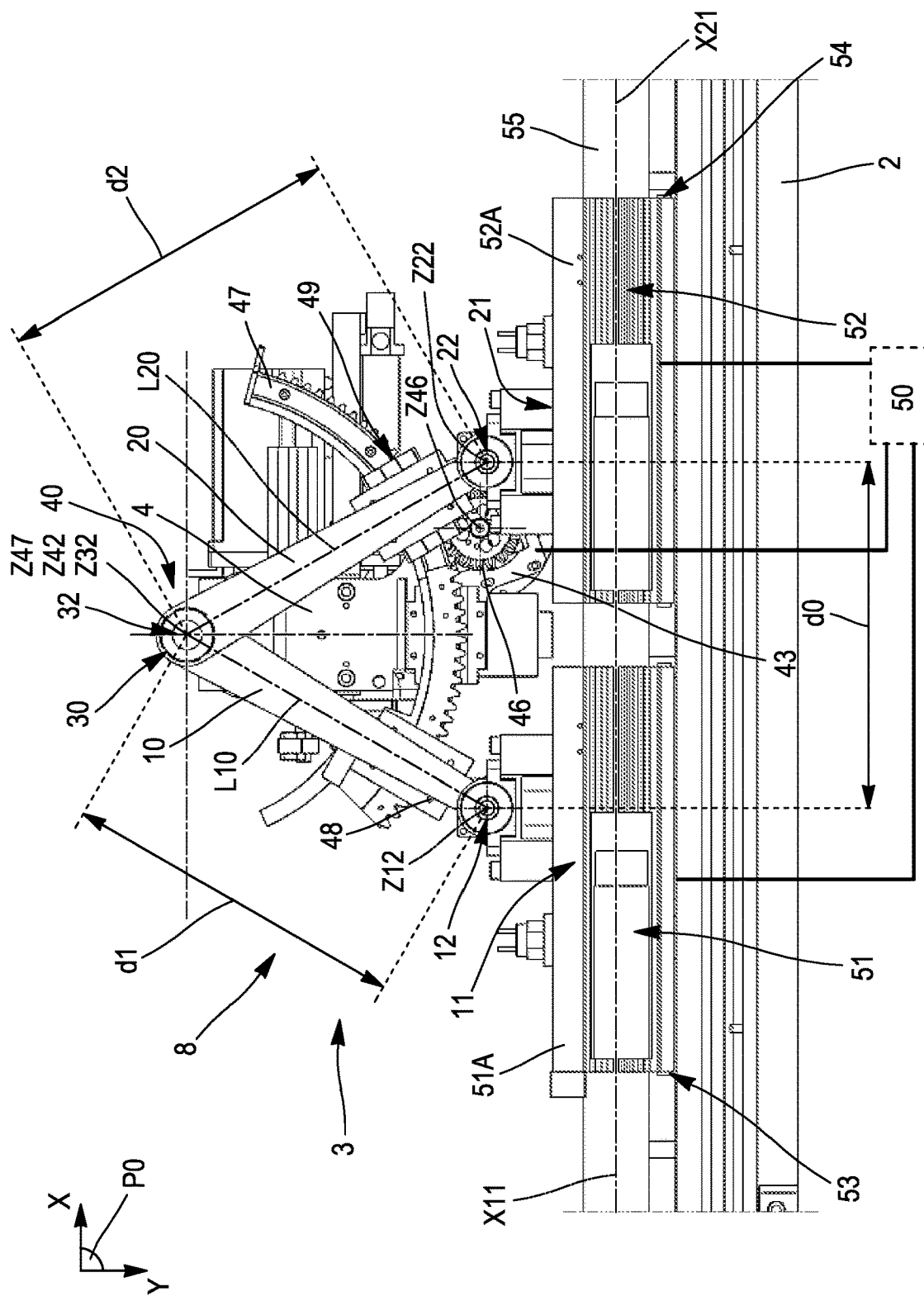
FIG. 4 illustrates, by a bottom view, the triangular arrangement of the manipulator device of FIG. 1, in a first configuration of the carriages.
Figure 5:
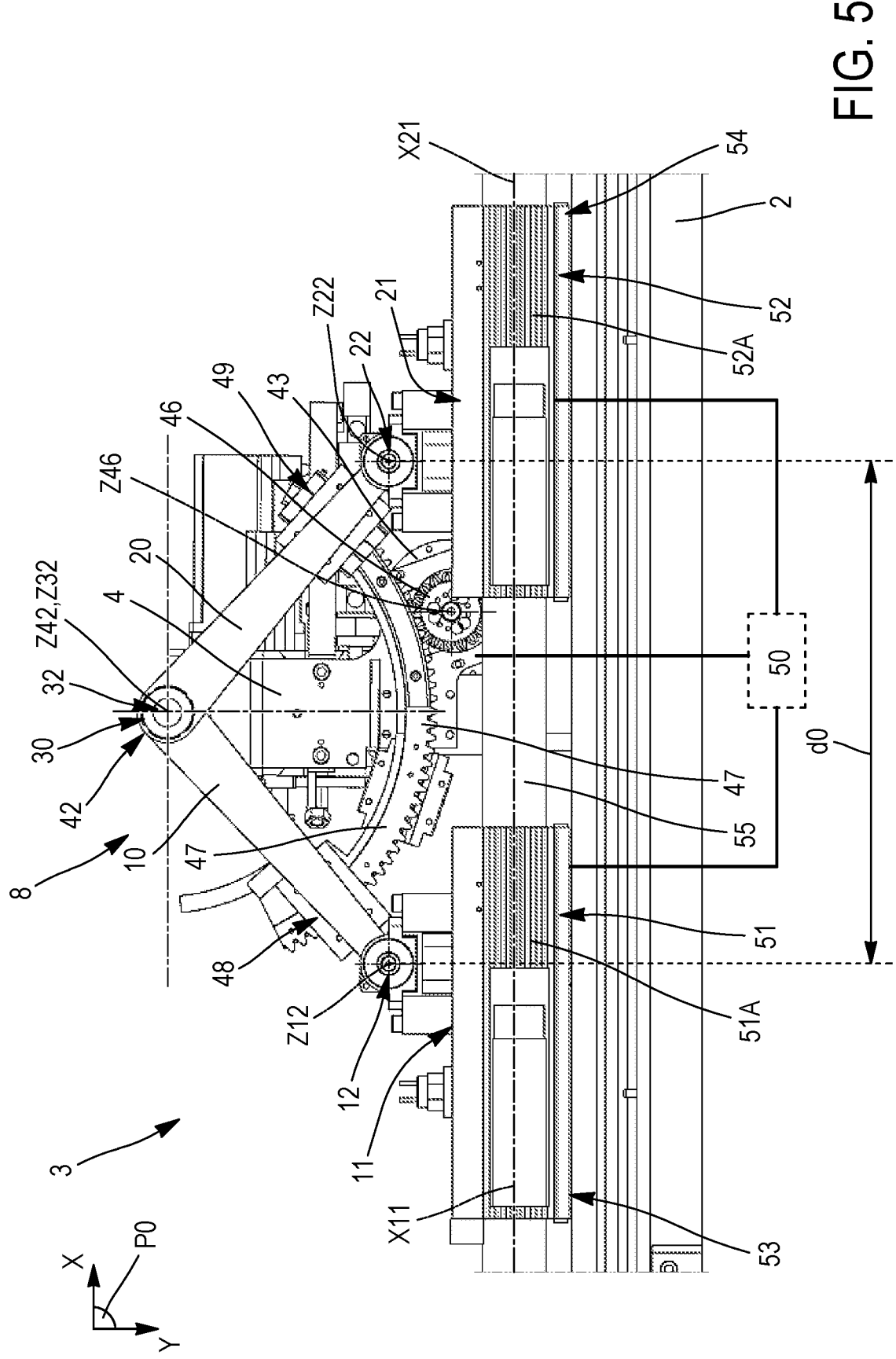
FIG. 5 illustrates, by a bottom view, the triangular arrangement of the manipulator device of FIG. 1, in a second configuration of the carriages, according to which the distance separating the carriages, called "base center distance", is greater than in the first configuration of FIG. 4, and therefore according to which the seat is closer to the base delimited by the carriages than it was in the first configuration, and according to which the angle at the vertex of the articulated triangle, contained between the first and second arms, is more open than it was in said first configuration.

According to the disclosure, and as can notably be seen in FIGS. 1, 4 and 5, the carrying mechanism 3 forms an articulated triangle 8, which comprises:
- a first arm 10 which is borne by a first carriage 11 guided in translation on the pedestal 2. Said first arm 10 is articulated with said first carriage 11 on a first pivot link 12 about a first pivot axis Z12 which forms a first vertex of the articulated triangle 8;
- a second arm 20 which is borne by a second carriage 21, which second carriage 21 is distinct from the first carriage 11 and guided in translation on the pedestal 2. Said second arm 20 is articulated with said second carriage 21 on a second pivot link 22 about a second pivot axis Z22, which is parallel to the first pivot axis Z12 and forms a second vertex of the articulated triangle 8;
- a seat 30, which offers a support to the platform 4 and which corresponds to an intersection of the first arm 10 and of the second arm 20, an intersection at which said first and second arms 10, 20 are articulated with respect to one another on a third pivot link 32, about a third pivot axis Z32 which is parallel to the first pivot axis Z12 and to the second pivot axis Z22 and which forms a third vertex of the articulated triangle 8.

Advantageously, the seat 30, situated at the intersection of the first arm 10 and of the second arm 20, therefore forms, on the one hand, a hinge between the first arm 10 and the second arm 20 which converge from their respective carriages 11, 21 to said seat 30, whereas, on the other hand, the platform 4 is connected to the arms 10, 20 of the articulated triangle 8 via said seat 30.

For convenience of description, a plane, called "reference plane" P0, will be considered which is normal to the third pivot axis Z32, and therefore also normal to the first pivot axis Z12 and to the second pivot axis Z22.

In projection in this reference plane P0, the first, second and third pivot axes Z12, Z22, Z32 form points, which correspond to the three vertices, here distinct pairwise, of the articulated triangle 8.

The segment which extends from the first pivot axis Z12 to the second pivot axis Z22 forms the base of the articulated triangle 8, a base which is potentially movable and/or of adjustable length by virtue of the first and second carriages 11, 21.

The third vertex which corresponds to the third pivot axis Z32 and therefore to the seat 30 forms the point of the articulated triangle 8, which is displaced, in the reference plane P0, to accommodate the displacements of the base and/or to accommodate the modifications of the length of the base which are induced by a relative movement of the first and second carriages 11, 21 and which provoke the deformation of the articulated triangle 8 about the first, second and third pivot links 12, 22, 32.

The pedestal 2 will preferably have an orthonormal reference frame associated with it, called "absolute reference frame", illustrated by a trihedron (X, Y, Z) in the figures, which define main axes X, Y, Z. The reference plane P0 advantageously corresponds to the plane defined by the first main axis X, which by convention forms the abscissa axis, and the second main axis Y, which by convention forms the ordinate axis.

Preferentially, the first, second and third pivot axes Z12, Z22, Z32, parallel to the third main axis Z, are oriented vertically, or at least substantially vertically, for example each contained within a cone delimited between −5 degrees and +5 degrees with respect to the vertical.

That way, the reference plane P0, and therefore the first main axis X and the second main axis Y, is substantially horizontal, even preferentially exactly horizontal.

By convention, it will be possible to associate the third main axis Z, here vertical, of the absolute reference frame, or any axis parallel to the third main axis Z (and therefore normal to the reference plane P0), with a yaw axis.

Likewise, it will be possible, by convention, to consider that a tilting about the first main axis X, here horizontal, or about any axis parallel to said first main axis X, corresponds to a roll movement, while a tilting about the second main axis Y, or about any axis parallel to said second main axis Y, corresponds to a pitch movement.

It will also be noted that, within the meaning of the disclosure, the first pivot link 12 and the second pivot link 22 are preferentially "exclusive" pivot links, of hinge type, in that they are arranged so as to allow a degree of freedom in rotation only about their respective pivot axis Z12, Z22, here therefore a degree of freedom in the yaw rotation, while they eliminate (at least), the two potential degrees of freedom in rotation, namely pitch and roll, between the members that these pivot links Z12, Z22 connect to one another.

More globally, preferably, the carrying mechanism 3 allows, by virtue of the first pivot link 12, a yaw rotation of the first arm 10 on the first carriage 11 about the first pivot axis Z12, and only about said first pivot axis Z12, but prevents the first arm 10 from tilting by pitch or roll with respect to the first carriage 11.

Likewise, preferably, the carrying mechanism 3 allows, by virtue of the second pivot link 22, a yaw rotation of the second arm 20 on the second carriage 21 about the second pivot axis Z22, and only about said second pivot axis Z22, but prevents the second arm 20 from tilting by pitch or roll with respect to the second carriage 21.

Preferably, the carrying mechanism 3 allows, by virtue of the third pivot link 32, a yaw rotation of the first arm 10 with respect to the second arm 20 (and, reciprocally, the second arm 20 with respect to the first arm 10) about the third pivot axis Z32, but prevents the first arm 10 from tilting by pitch or roll with respect to the second arm 20.

By eliminating the pitch and roll degrees of freedom, it is advantageously possible to confer a good structural rigidity on the carrying mechanism 3, and therefore produce an accurate and easy control of the positioning of the seat 30 with respect to the pedestal 2.

Preferably, the abovementioned first, second and third pivot links 12, 22, 32, and in particular the third pivot link 32, may be produced for example by means of shouldered ball bearings, or even, for compactness and lightness, by means of needle bearings associated with axial ball end stops. Such bearings in fact advantageously allow for a fitting which will be able to be axially constrained by clamping, and therefore without clearance, which will guarantee an excellent rigidity on said pivot links.

Furthermore, the first, second and third pivot links 12, 22, 32 will preferably be free, that is to say not intrinsically motorized, so as to be able to adapt spontaneously to the deformation needs of the articulated triangle 8, almost without resisting the pivoting movement by any resistance force.

Moreover, it will be noted that, particularly advantageously, the articulated triangle 8 preferably forms a self-supporting structure, in that the first and second arms 10, 20, borne by their carriages 11, 21, are sufficient to bear the seat 30 and the platform 4 with respect to the pedestal 2, and to position said seat 30, and more particularly the third pivot axis Z32, in a deterministic manner in the absolute reference frame (X, Y, Z), without it being necessary to make use of an additional member, such as, for example, one or more auxiliary arms.

In fact, the position of the third pivot axis Z32, that is to say of the third vertex of the articulated triangle 8, in the reference plane P0, results deterministically from just the fixing of the position of the two other vertices Z12, Z22, that is to say, here, just the fixing of a pair of parameters constituted by the position (on abscissa) of the first carriage 11 and the position (on abscissa) of the second carriage 21.

The manipulator device 1 can thus have a structure that is simple, compact and lightweight, allowing displacements of the seat 30 that are accurate and with little inertial effect.

Each of the first and second arms 10, 20 will advantageously be non-deformable, in that it will have no intermediate articulation between, on one side, the pivot link 12, respectively 22, which connects the arm 10, 20 considered to its carriage 11, respectively 21, and, on the other side, the third pivot link 32 of the seat 30.

This non-deformable feature of the first arm 10, respectively of the second arm 20, by longitudinal traction (in the longitudinal direction of the arm 10, 20 considered, between the two pivot links that said arm links to one another), by longitudinal compression, by bending, and by twisting, makes it possible to control, in a simple, reliable and deterministic way, the structure of the articulated triangle 8, and therefore the positioning of the seat 30 with respect to the pedestal 2, since each arm 10, 20 may be advantageously used as (non-extendable) tie-rod, as (non-compressible) push-rod, and/or as supporting boom (by analogy with the boom of a crane) to bear the seat 3 and the platform 4 overhanging with respect to the pedestal 2.

Preferably, the distance d1 which separates the first pivot axis Z12 from the third pivot axis Z32, called "first center distance" d1, is invariant.

As can be seen in FIG. 4, this first center distance d1 corresponds in practice to the length of the first side of the articulated triangle 8, and more particularly to the length of the first arm 10, which links the first carriage 11 to the seat 30.

This first center distance d1 has a non-zero value, such that the third pivot axis Z32 is offset (and held) by the first arm 10 at a distance d1 from the first pivot axis Z12.

Likewise, the distance d2 which separates the second pivot axis Z22 from this same third pivot axis Z32, called "second center distance" d2, is preferably invariant.

As can be seen in FIG. 4, this second center distance d2 corresponds in practice to the length of the second side of the articulated triangle 8, and more particularly to the length of the second arm 20, which links the second carriage 21 to the seat 30.

This second center distance d2 has a non-zero value, such that the third pivot axis Z32 is offset (and held) by the second arm 20 at a distance d2 from the second pivot axis Z22, which is itself not coaxial to the first pivot axis Z12.

Advantageously, the invariance of the first and second center distances d1, d2 allows the rigidity of the manipulator device 1 to be optimized, and the setting then the control of the displacements of the carrying mechanism 3 to be simplified.

Furthermore, advantageously, the articulated triangle 8 can adopt, in the reference plane P0, at least one non-flat configuration, and preferably a plurality of non-flat functional configurations, in which none of its vertices Z12, Z22, Z32 is superposed on another of its vertices Z12, Z22, Z32, that is to say in which the first, second and third pivot axes Z12, Z22, Z32, that are distinct pairwise, are distant pairwise (that is to say pairwise not coaxial), which contributes to the rigidity and the stability of the carrying mechanism 3.

In absolute terms, according to a variant embodiment, it would be possible to envisage, prior to the use of the manipulator device 1, a possibility of setting, called "fixed setting" or "factory setting", the length of the first center distance d1 and/or the second center distance d2, for example by means of a nut/lock nut system, chocks, or any other equivalent means which would make it possible to adjust the length of the arm 10, 20 concerned.

Once this setting is made, it would be retained, that is to say the values chosen for the first center distance d1 and for the second center distance d2 would be invariant, during the use of the manipulator device 1, and notably during displacement of the first and/or second carriages 11, 21, inasmuch as these center distance parameters d1, d2 condition the servocontrol laws which allow the seat 30 to be displaced and positioned with respect to the pedestal 2.

However, particularly preferentially, for simplicity of implementation and to avoid creating sources of drift during the operation of the manipulator device 1, a variant embodiment will be used in which the first center distance d1 and the second center distance d2, and more globally the form and the length of each of the first and second arms 10, 20, will be determined definitively by construction, in the factory, and definitively invariant.

Preferably, in the articulated triangle 8, the only thing that will be modified, here dynamically, depending on the requirements, is the length of the third side, called "base center distance" d0, which corresponds to the length of the base which separates the first pivot axis Z12 borne by the first carriage 11 from the second pivot axis Z22 borne by the second carriage 21, as can notably be seen in FIGS. 4 and 5.

Particularly preferentially, the first center distance d1 and the second center distance d2 will be equal, such that the articulated triangle 8 is an isosceles triangle.

Such a symmetrical arrangement will simplify the servocontrolling of the position of the seat 30, and will favor a relatively uniform dynamic behavior of the carrying mechanism 3.

It will also be noted that, preferentially, in order to reconcile rigidity, notably rigidity to bending and to twisting, and lightness, the first arm 10 and/or the second arm 20 will have at least one cross section CS, whose dimension on the vertical main axis Z, called "height", will be greater than the dimension on the corresponding horizontal axis, called "width", as can notably been seen in FIG. 1.

Cross section CS denotes, in the normal sense of beam theory, a flat section which is normal to the longitudinal median line L10, L20 on which the arm 10, 20 considered links the carriage 11, 21 to the seat 30.

For simplicity of production, said cross section CS may be, for example, rectangular.

Moreover, preferably, in order to combine lightness and rigidity, the first arm and/or the second arm may have a composite structure, comprising a core which is produced in a high-density foam, for example a high-density polyurethane foam, and which is jacketed in a carbon fiber-based ply.

All or part of the members necessary to the production of the pivot links 12, 22, 32, such as the recesses for the bearing rings, even the bearing rings themselves if they are incorporated in the arms 10, 20, may be then formed by inserts, which will be produced in a metallic material chosen for its rigidity, such as a titanium alloy, and which will be embedded in the composite structure of the arm 10, 20 considered.

Referring to the abovementioned cross section CS, the carbon fiber ply will delimit all the perimeter of said cross section CS, while the high-density foam will fill the interior, preferably all the interior, of said cross section CS.

According to the disclosure, the articulated triangle 8 also comprises, as can be seen notably in FIGS. 1 and 4, a servocontrol module 50 which controls, on the one hand, a first motor 51, specific to the first carriage 11, and, on the other hand, a second motor 52, specific to the second carriage 21 and distinct from the first motor 51, so as to be able to distinctly servocontrol the respective translational movements of the first and second carriages 11, 21 with respect to the pedestal 2, in order to be able to modify the position of the seat 30 with respect to the pedestal 2.

The first motor 51 is therefore arranged to drive the first carriage 11 in translation on the pedestal 2, along a guided and captive trajectory, which can preferably be embodied by a first guiding member 53, such as a guiding rail 53.

Likewise, the second motor 52 is arranged to drive the second carriage 21 in translation on the pedestal 2, along a guided and captive trajectory, which can preferably be embodied by a second guiding member 54, such as a guiding rail 54.

Preferably, the first carriage 11 is guided in rectilinear translation with respect to the pedestal 2 on a first guiding axis X11 which is at right angles to the first pivot axis Z12 while the second carriage 21 is guided in rectilinear translation with respect to the pedestal 2 on a second guiding axis X21 which is parallel to the first guiding axis X11.

Such an arrangement is advantageously simple and compact, and allows for an accurate control of the carriages 11, 21 and therefore an accurate control of the positioning of the seat 30.

The first guiding axis X11 and the second guiding axis X21 are, here, parallel to the first main horizontal axis X (abscissa axis).

It is thus possible to simplify the servocontrolling of the positioning of the seat 30, and make it particularly accurate.

Preferably, the guiding of the first carriage 11 on the first geometrical guiding axis X11 is ensured structurally by the first guiding member 53, namely the abovementioned first guiding rail 53, which extends in a direction colinear to said first geometrical guiding axis X11. The same preferably applies for the second carriage 21, the guiding of which on the second geometrical guiding axis X21 is ensured structurally by the second guiding member 54 which extends in a direction colinear to said second geometrical guiding axis X21. Furthermore, the first guiding member 53 and the second guiding member 54 are preferably advantageously arranged to prevent the tilting by roll (about the main axis X, and more particularly about the guiding axes X11, X21) and the tilting by pitch (about the main axis Y), of the first carriage 11, and respectively the tilting by roll and by pitch of the second carriage 21, with respect to the pedestal 2.

This anti-tilting effect can be obtained by giving each carriage 11, 21 a sufficiently long guiding way on each of the first and third main axes X and Z, for example by using, for each carriage 11, 21 several guide shoes, of the recirculating ball shoe kind, distributed on said main axes X and Z, and/or by using, as can be seen in FIG. 1, a guiding member 53, 54 of "T" groove or dovetail runner type.

Particularly preferentially, the second guiding axis X21 is coaxial to said first guiding axis X11.

Advantageously, the first carriage and the second carriage 11, 21 can thus share the same common guiding axis X11, X21, and therefore be mounted and guided on one and the same guiding member 53, 54.

This notably makes it possible to reduce the manufacturing cost of the manipulator device 1, and simplify the construction and the setting of the carrying mechanism 3.

In particular, the abovementioned guiding rails 53, 54 can thus be merged into one and the same shared guiding rail 53, 54, which may possibly be produced in a single piece at least over the length cumulatively covered by the travels of the first and second carriages 11, 21, as is illustrated in FIGS. 1, 2, 4 and 5.

The first motor 51 and the first motor 52 are preferably electric motors, and particularly preferentially, linear electric motors, which obtain high accuracy and good rigidity in holding each carriage 11, 21 in the desired position along the guiding axis X11, X21.

Preferably, the first carriage 11 and the second carriage 21 can form, respectively, as can be seen in FIGS. 1, 4 and 5, a first coil pack 51A of a first linear motor 51 and a second coil pack 52A of a second linear motor 52, distinct from the first linear motor 51.

Particularly preferentially, the first and second coil packs 51A, 52A of said first and second linear motors 51, 52 can then advantageously be slidingly engaged on one and the same common magnetic bar 55, which is fixed onto the pedestal 2 and which embodies, as was envisaged above, a guiding axis X11, X21 shared by the first carriage 11 and the second carriage 21, as can notably be seen in FIGS. 1, 2, 4 and 5.

Here again, such an arrangement will make it possible to obtain a manipulator device 1 that is simple, reliable and compact.

The magnetic bar 55 may be of cylindrical form with circular base, and with a generatrix parallel to the guiding axis X11, X21.

Said magnetic bar 55 may be equipped with permanent magnets.

It will be noted that, whereas, generally, the linear motors use the coil pack as stator and the magnetic bar as movable core, the manipulator device 1 according to the disclosure advantageously prefers using the magnetic bar 55 as stator, fixed onto the pedestal 2, and common to the first and second motors 51, 52, while the coil packs 51A, 52A are used as movable members.

Since the characteristics of the two coil packs 51A, 52A are preferably identical, and the characteristics of the magnetic bar 55 are preferably identical over all the continuous length of said magnetic bar 55 that is likely to be travelled by the first coil pack and/or by the second coil pack 51A, 52A, it will thus advantageously be possible to benefit from a displacement reference and a displacement pitch (corresponding to the smallest possible displacement increment between two positions of a coil pack, and therefore to the finest positioning resolution of said coil pack) which is identical for both carriages 11, 21, which will simplify the servocontrol.

Furthermore, such a solution consisting in using the magnetic bar 55 as stator common to the two carriages 11, 21 makes it possible to reconcile simply, while producing a saving on mechanical components, a shared guiding and an independent servocontrol of each of the first and second motors 51, 52, since the electrical power supply of each of the coil packs 51A and 52A threaded over the magnetic bar 55 can be activated and controlled individually, separately from the other coil pack 52A, 51A, by the servocontrol module 50.

By choosing the sign and the norm (absolute value) of the displacement imparted individually on each carriage 11, 21 along the guiding axis X11, X21, here therefore preferably on abscissa, it will be possible to obtain any freely chosen resulting trajectory of the seat 30 in the cartesian reference frame associated with the reference plane P0.

These signs and norms of displacements are schematically represented by vectors in the examples of FIGS. 6A to 6D.

In particular, it will thus notably be possible to impose on the first carriage 11 and on the second carriage 21 displacements:
- of the same norm, but of opposite signs (FIGS. 6A and 6B), which will have the effect of displacing the seat 30 purely along the second main axis Y, that is to say on ordinates, but without modifying the position of said seat 30 on the main abscissa axis X, which corresponds to the guiding axis X11. Depending on whether the distance between the carriages 11, 21 is reduced (FIG. 6A) or increased (FIG. 6B), the base center distance d0 will, by contrast, be reduced or increased, and consequently the height of the articulated triangle 8 will consequently be increased or, by contrast reduced, which will have the effect of moving the seat 30 away from or by contrast, closer to the guiding axis X11;
- of same norm and of same sign, which will make it possible to obtain a translation of the seat 30 that is purely parallel to the guiding axis X11 and therefore parallel to the main axis X (FIG. 6C), that is to say, here, a displacement on abscissa;
- of same sign but of different norms, which will make it possible to simultaneously generate, on the one hand, a relative displacement between the first and second carriages 11, 21, a relative displacement which creates a first component of displacement of the seat 30 in the heightwise direction of the triangle, on the second main axis Y, away from or closer to the guiding axis X11, that is to say, here, a first component of displacement on ordinates, and, on the other hand, a combined movement of said carriages 11, 21 in the direction defined by the chosen sign, which creates a second component of displacement of the seat 30, parallel to the guiding axis X11 and therefore parallel to the main axis X, that is to say, here, a second component of displacement on abscissa, said first and second components being combined to produce a resulting displacement of the seat 30 which can thus follow any predefined oblique trajectory, that may be curved or rectilinear, in the reference plane P0.

The respective speeds (in particular their norms and signs) of the first and second carriages 11, 21 along their guiding axis X11, X21, and, if appropriate the respective accelerations of said carriages 11, 21 along said guiding axis X11, X21, can be servocontrolled in real time by the servocontrol module 50.

It will also be noted that, according to a preferential feature, the servocontrol module 50 can contain at least one control law which is designed to control an acceleration of the seat 30, said acceleration being considered in a reference plane P0 which is normal to the first, second and third pivot axes Z12, Z22, Z32, and at a point called "seat center" which corresponds to the intersection of the third pivot axis Z32 with said reference plane P0.

According to one implementation possibility, the control law could define the acceleration in the form of a value that is constant, in that it would not be a variable function of time.

However, preferentially, said control law will make it possible to define the acceleration of the seat 30 from an expression of degree $\underline{N}$ with respect to time, with $\underline{N}$ being an integer equal to or greater than 1, such that said expression is at least of the first degree (N=1) with respect to time (t), preferably at least of the second degree (N=2) with respect to time ($t^2$), even of the third degree with respect to time ($t^3$) or even of a degree N greater than three (N>3).

Thus, it would even be possible to envisage a seat 30 acceleration control law in the form of an expression of a higher degree with respect to time, for example of fourth degree (N=4), of fifth degree (N=5) even of sixth degree (N=6) with respect to time.

Said control law will notably be able to take the form of a polynomial of the desired degree $\underline{N}$ with respect to the "time" variable.

Advantageously, by varying the acceleration of the seat 30 as a function of the "time" variable according to a control law which has a sufficiently high degree with respect to said "time" variable, it will be possible to effectively manage the trend of the first derivative of the acceleration with respect to time, and consequently control, even eliminate, the "jerk" vector. Indeed, if the acceleration law is of degree $N \geq 1$ with respect to time, the first derivative value will be at least a constant (if $N=1$), or even a variable function of time (if $N>1$).

It will thus be possible to implement very high accelerations, without damage to the structure of the carrying mechanism 3 or degradation of the performance levels in terms of accuracy. The rate of operation of the manipulator device 1 will thereby be considerably enhanced.

The control law will be applied at least to each of the first and second carriages 11, 21 to the extent necessary to obtain, on the seat 30, the desired acceleration value, and more particularly the value corresponding to the acceleration component on abscissa X and the corresponding value of the acceleration component on ordinate Y, and vary said acceleration according to the requirements.

It will be noted that, by mere integration, if the acceleration servocontrol law is an expression of degree N with respect to time, the corresponding speed servocontrol law will be of degree N+1 with respect to time, and the corresponding position servocontrol law of degree N+2 with respect to time.

According to the disclosure, the carrying mechanism 3 which forms the articulated triangle 8 also comprises a yaw orientation interface 40 which comprises a fourth pivot link 42, called "yaw differential pivot" 42, by which the platform 4 is articulated on the seat 30, both relative to the first arm 10 and relative to the second arm 20, by a yaw rotation movement R42 called "yaw differential movement" R42, about an axis called "yaw differential axis" Z42 which is coaxial to the third pivot axis Z32, as can notably be seen in FIGS. 1, 2, 3 and 8 to 10.

Advantageously, said yaw orientation interface 40 allows the angular orientation, called "yaw orientation", of the platform 4 to be modified with respect to each of the first and second arms 10, 20, about a same yaw rotation center which is located on the third pivot axis Z32, at the intersection of the first and second arms 10, 20.

Thus, advantageously, whereas the first and second arms 10, 20 and their respective carriages 11, 21 make it possible to choose and modify the cartesian position of the seat 30, and therefore the cartesian position of the platform 4 and of the object to be manipulated 5, in the cartesian reference frame (X, Y, Z) attached to the reference plane P0 and to the pedestal 2, that is to say choose and modify the position on abscissa, on the first main axis X, and the position on ordinate, on the second main axis Y, of the seat 30 and therefore of the object to be manipulated 5, the yaw orientation interface 40, for its part, makes it possible to freely define, and, if appropriate, vary, the yaw orientation of said platform 4, and therefore the yaw orientation of the object to be manipulated 5, in said reference plane P0, with respect to a differential yaw axis Z42 which is parallel to the third main axis Z and which coincides with this given cartesian position of the seat 30 at any considered instant.

In other words, the yaw orientation interface 40 advantageously makes it possible to dissociate the choice of the cartesian position of the seat 30, and therefore the cartesian positioning, on abscissa X and on ordinate Y, of the platform 4, and consequently the cartesian positioning of the object to be manipulated 5, with respect to the pedestal 2 on the one hand, from the setting of the yaw angular orientation of said platform 4, and therefore from the setting of the yaw orientation of the object to be manipulated 5, with respect to the pedestal 2, on the other hand.

In fact, whereas the cartesian positioning of the seat 30 and therefore the cartesian positioning of the platform 4, and more particularly the modification of the cartesian position of the seat 30 and therefore the modification of the cartesian position of the platform 4, notably on ordinate Y, can have, even necessarily have, an impact on the orientation of the two arms 10, 20 of the articulated triangle 8, the yaw orientation of the platform 4, on the other hand, no longer has a forced link of dependency with the orientation of either one of the first arm 10 and the second arm 20, by virtue of the decorrelation provided by the yaw orientation interface 40.

Advantageously, it will therefore be possible to separately control a cartesian position setpoint, or a cartesian displacement setpoint, on abscissa X and/or on ordinate Y, in the reference plane P0, and a yaw orientation setpoint, about a yaw differential axis normal to said reference plane P0, to define, at any instant, the configuration (position on the one hand and orientation on the other hand) of the platform 4 in space, with respect to the pedestal 2.

Preferably, the yaw orientation interface 40 comprises a yaw orientation motor 43, which is controlled by the servocontrol module 50 and which is arranged so as to, when said yaw orientation motor 43 is activated, drive the platform 4 by the yaw differential movement R42, about the yaw differential axis Z42, with respect to the first and second arms 10, 20.

It will be noted that said yaw orientation motor 43 can preferably be embedded on the platform 4, as is illustrated in FIGS. 1 to 5.

Said yaw orientation motor 43 is preferably coupled to a pinion 46 which meshes on a toothed crown ring portion 47 engaged on one and/or the other of the first and second arms 10, 20.

The motorization advantageously makes it possible to improve the accuracy of the yaw control of the platform 4, and to automate this yaw control, so as to be able to follow any freely chosen trajectory. In particular, it will be possible to servocontrol the yaw control of the platform 4 so as to be able to ensure, at any moment, an orientation of the object to be manipulated 5 which is tangential to the surface of the assembly support 7, considered in projection in the reference plane P0, as can be seen in FIG. 10.

The orientation motor 43 is preferably an electric motor.

The shaft of the yaw orientation motor 43, like the central axis Z46 of the pinion 46, and the central axis Z47 of the toothed crown ring portion 47, are preferably parallel to one another, and preferentially parallel to the third pivot axis Z32, that is to say, here, vertical.

More preferentially, the central axis Z47 of the toothed crown ring portion 47 will be coaxial to the third pivot axis Z32, and therefore to the yaw differential axis Z42, that is to say that the toothed crown ring portion 47 will be centered on the third pivot axis Z32.

It will be noted that the yaw orientation motor 43 is preferably mostly situated, even preferably entirely situated, on the side of the base of the articulated triangle 8 with respect to the third pivot axis Z32, that is to say in a space contained between the third pivot axis Z32 and the support portion 2 which embodies the guiding axis X11, X21 of the carriages 11, 21, and more particularly between the third pivot axis Z32 and the first and second guiding rails 53, 54.

Advantageously, this makes it possible to bring said yaw orientation motor 43 close to the guiding axis X11, X21, and, if any, the corresponding guiding rails 53, 54, and more globally makes it possible to place in proximity to the guiding axis X11, X21, and more specifically in proximity to the guiding members 53, 54 which embody said guiding axis, the movable elements which are embedded by the carrying mechanism 3, which has the effect of minimizing the lever arm between the center of gravity of the yaw orientation motor 43 and the guiding axis X11, X21, and therefore makes it possible to reduce the inertial effects on the carrying mechanism 3, and the effects linked to the overhanging arrangement of the arms 10, 20, of the platform 4 and of the yaw orientation motor 43 with respect to the guiding axis X11, X21, an overhang which tends to create, with respect to the guiding members 53, 54, a roll-wise deflection moment, because of gravity.

According to a preferential feature which can constitute an entirely separate disclosure, the yaw orientation interface 40 comprises a compensating system 44 which is arranged to cooperate with the yaw different pivot 42 so as, on the one hand, to confer on the platform 4, in a reference frame attached to the pedestal 2, called "absolute reference frame" (X, Y, Z), a determined yaw angular orientation about the yaw differential axis Z42 coaxial to the third pivot axis Z32, called "absolute yaw reference orientation", here denoted A4_ref notably in FIGS. 7A, 7B, 8, 9, 10, and, on the other hand, to be able to automatically keep the platform 4 in this absolute yaw reference orientation A4_ref with respect to the pedestal 2, in said absolute reference frame (X, Y, Z) attached to the pedestal 2, during displacements of the first carriage and/or of the second carriage 11, 21 which modify the distance, called "base center distance" d0, which separates the first pivot axis Z12 from the second pivot axis Z22.

The absolute yaw orientation of the platform 4 will more particularly be able to be considered as the yaw angle formed, in the reference plane P0, between any element of said platform 4, fixed with respect to said platform 4, and the guiding axis X11, X21.

In practice, in the reference plane P0, the compensating system 44 makes it possible, when modifying the cartesian position (on abscissa X and/or on ordinate Y) of the seat 30, a cartesian position which is here marked by the third pivot axis Z32, to displace the platform 4 with respect to the first and second arms 10, 20 by yaw on said seat 30, via the yaw orientation interface 40, by an angular value that is sufficient to compensate the yaw tilting of the arms 10, 20. The resulting yaw orientation of the platform 4, considered in the absolute reference frame attached to the pedestal 2, therefore remains unchanged, even though the cartesian position of the seat 30, and more particularly the distance between the seat 30 and its third pivot axis Z32 and the guiding axis X11, X21, has been modified.

According to a possible variant embodiment, such a compensating system 44 can use, as is illustrated in FIGS. 7A and 7B, an articulated parallelogram mechanism 60 linking, via a connecting rod 61, the platform 4 to a setting lever 45 which is captive of a carriage, here the second carriage 21, and whose yaw inclination with respect to the guiding axis X21 of said carriage 21, here the shared guiding axis X11, X21, is fixed so as to be invariant, and depends, in the reference plane P0, on the value desired for the absolute yaw reference orientation A4_ref.

Other variants of compensating system 44 can however be envisaged, for example a variant which uses the pinion 46 and the toothed crown ring 47 mentioned above, as will be detailed hereinbelow.

Moreover, preferably, the servocontrol module 50 can take for reference, to define an origin from which said servocontrol module 50 controls the yaw orientation motor 43 and quantifies the yaw differential movements R42 of the platform 4, such that these yaw differential movements R42 are generated by the activation of said yaw orientation motor 43, the configuration that said yaw orientation motor 43 has when the platform 4 is oriented in accordance with chosen absolute yaw reference orientation A4_ref.

In other words, the servocontrol module can advantageously make the "relative" zero of the yaw orientation motor 43, which, when activated and thus starts moving, generates a relative displacement of the platform 4 with respect to the seat 30, that is to say typically make the "zero position" constituting the origin with respect to which the amplitude of rotation of the shaft of the yaw orientation motor 43 with respect to the stator of said motor 43 is measured, coincide with the "absolute" zero, which corresponds to the chosen, invariant, absolute yaw reference orientation A4_ref, and with respect to which it is possible to express, in the absolute reference frame attached to the pedestal 2, the absolute measurement of yaw orientation of the platform 4.

Such an overlaying of the origins facilitates the calibration and the servocontrolling of the yaw of the carrying mechanism 3 and of the platform 4.

In fact, the displacement value which will be measured on the yaw orientation motor 43, with reference to this origin, for example by means of an angular position sensor incorporated in the shaft of said yaw orientation motor 43 and calibrated on this origin, such as a sensor of resolver type, will thus directly indicate the absolute yaw angular orientation effectively taken by the platform 4, in the absolute reference frame attached to the pedestal 2.

Furthermore, since the choice of the absolute yaw reference orientation A4_ref is free for the user, it is thus possible to easily apply, as many times as necessary, prior to a seat 30 displacement cycle, a realignment of origin (a redefinition of origin) for the yaw servocontrol of the platform 4. It is thus possible to choose, for each type of trajectory, the most appropriate conditions which most simplify the servocontrol laws.

According to a preferential arrangement which can constitute an entirely separate disclosure, and which is present in FIGS. 1 to 5, the yaw orientation interface 40 comprises, on the one hand, a circular toothed crown ring portion 47, which is centered on the third pivot axis Z32 and which links the first arm 10 to the second arm 20 by being fixed in invariant position on the first arm 10 and slidingly guided on the second arm 20 at a fixed radial distance from the third pivot axis Z32, so as to be able to accommodate the angular separation or angular convergence displacements of the first and second arms 10, 20 induced by the displacements of the first carriage 11 and/or of the second carriage 21, and, on the other hand, a pinion 46, which meshes on said toothed crown ring portion 47, and which is coupled to a yaw orientation motor 43, which is itself embedded on the platform 4, such that it is possible to selectively control the yaw orientation interface 40 by choosing from among a plurality of distinct operating regimes, comprising:

a first operating regime, called "simple compensation regime", in which the yaw orientation motor 43 is activated to an extent that is just necessary and sufficient for the rolling meshing of the pinion 46 on the toothed crown ring portion 47 to ensure that the absolute yaw orientation of said platform 4 with respect to the pedestal 2 is maintained, by thus producing a compensation of the movements of the first and second arms 10, 20 which are induced by the displacement of one and/or the other of the first and second carriages 11, 21;

a second operating regime, called "active reorientation regime", in which the yaw orientation motor 43 is activated so as to drive the pinion 46 to an extent such that the rolling meshing of the pinion 46 on the toothed crown ring portion 47 provokes an active modification of the absolute yaw orientation of the platform 4 with respect to the pedestal 2.

It will be noted that, advantageously, the yaw orientation motor 43, the pinion 46 and the toothed crown ring portion 47 can advantageously form a multifunction subassembly, capable of ensuring equally the compensating system function 44, here by simple compensation, and the function of servocontrol and active modification of the yaw orientation of the platform 4 with respect to the pedestal 2.

Advantageously, the simple compensation regime makes it possible to retain an absolute yaw orientation of the platform 4 that is constant, even though the position of one of the carriages or both of the carriages 11, 21 is modified and consequently a reconfiguration of the geometrical structure of the articulated triangle 8 is provoked, with a yaw reorientation of the first and second arms 10, 20 in the absolute reference frame (X, Y, Z) associated with the pedestal 2.

In practice, it will thus be possible notably to use the simple compensation regime to retain an absolute yaw orientation of the platform 4 which is constant and equal to the chosen absolute yaw reference orientation A_ref. It will thus be possible, as stated above, to make the origin with respect to which it is chosen to control the subsequent movements of the yaw orientation 43 coincide with the absolute yaw reference orientation (X, Y, Z), when wanting to actively modify, and if necessary dynamically modify, in accordance with the active reorientation regime, the yaw orientation of the platform 4 in the absolute reference frame, to give said platform 4 a yaw orientation that is different from the chosen initial reference orientation A4_ref.

When it is activated, the yaw orientation motor 43 generates a rotation of its shaft with respect to the stator of said yaw orientation motor 43, which is itself secured to the platform 4, and therefore generates a rotational movement of the pinion 46 on the central axis Z46 of said pinion 46, with respect to the stator of the yaw orientation motor 43.

The pinion 46 then rolls, by meshing, over the toothed crown ring portion 47, which modifies the yaw orientation of the platform 4 with respect to said toothed crown ring portion 47.

Figure 3:
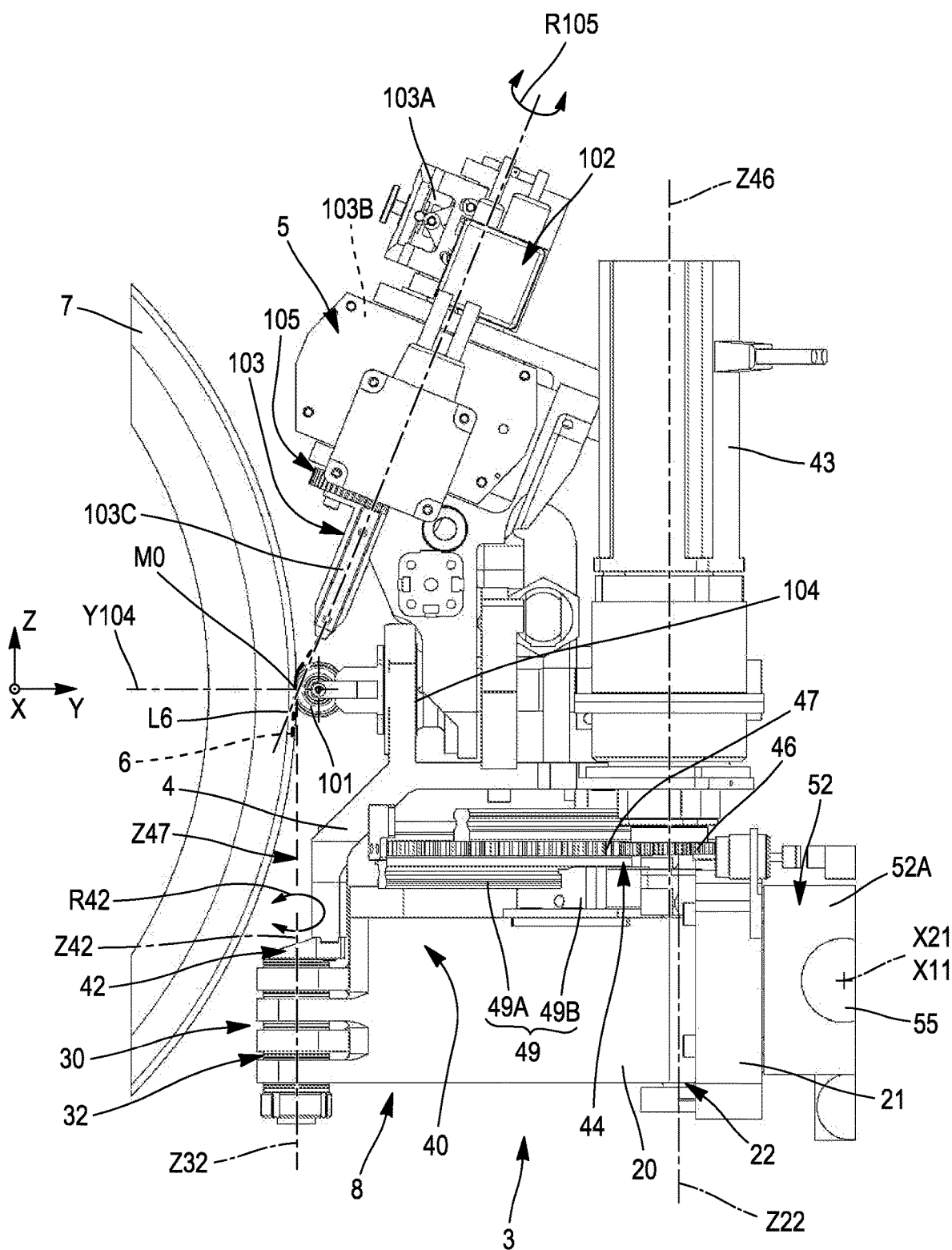
FIG. 3 illustrates, by a side detail view, a part of the installation of FIG. 2.

The fixing of the toothed crown ring portion 47 onto the first arm 10 may be done by a screwed base 48, whereas the captive and guided sliding of said toothed crown ring portion 47 with respect to the second arm 20 may be produced by means of a runner 49, for example a ball-bearing runner, within which, as can be seen in FIG. 1 or 3, a curved rail 49A cooperates with one or more ball shoes 49B, of conjugate form, fixed on the second arm 20.

If the carriage or carriages 11, 21 are displaced so as to modify the base center distance d0, and therefore the cartesian position of the seat 30 in the absolute reference frame (X, Y, Z), then the angular aperture between the first arm 10 and the second arm 20 is modified accordingly (in the manner in which, by analogy, the two legs of a compass might be moved apart or moved closer one to the other), which has the effect of causing the toothed crown ring 47 to slide, driven by the first arm 10, by a certain arc length in the runner 49 fixed to the second arm 20.

If, preferably synchronously with the displacement of the carriages 11, 21, an activation of the yaw orientation motor 43 is executed which provokes the rotation of the pinion 46 over a sufficient amplitude for said pinion 46 to cover, by rolling over the toothed crown ring 47, an arc length of the toothed crown ring 47 equal to that by which said toothed crown ring 47 is displaced with respect to the runner 49, then, inasmuch as the yaw rotation of the toothed crown ring 47 and the rotation of the platform 4 on the seat 30 are both performed about one and the same geometrical center of rotation, here corresponding to the yaw differential axis Z42 which coincides with the third pivot axis Z32, a return is finally obtained (if the rotation of the pinion 46 occurs after the displacement of the carriages 11, 21, or occurs with phase delay with respect to said displacement of the carriages 11, 21), or, possibly, the platform 4 is finally dynamically held (if the rotation of the pinion 46 is synchronized with the displacement of the carriages 11, 21) in its original absolute yaw orientation, here preferably the absolute yaw reference orientation 4A ref, in the absolute reference frame (X, Y, Z).

Conversely, if the activation of the yaw orientation motor 43, and the corresponding rotation of the pinion 46 over (and along) the toothed crown ring 47, occurs outside of any displacement of the carriages 11, 21, while the platform 4 has a yaw orientation which corresponds with its absolute reference orientation A4_ref, or else if, during a displacement of the carriages 11, 21 or following such a displacement of the carriages 11, 21, the amplitude of the displacement of the pinion 46 along the toothed crown ring 47 differs from the arc length by which the toothed crown ring 47 is displaced with respect to the runner 49, then, this time, a modification is observed of the absolute yaw angular orientation of the platform 4 with respect to the absolute reference yaw orientation A4_ref, by a yaw deviation value denoted A4_diff in FIG. 10, which is a function of the difference between the arc length travelled by the toothed crown ring 47 and the arc length made up by the pinion 46 along said toothed crown ring 47.

Figure 8:
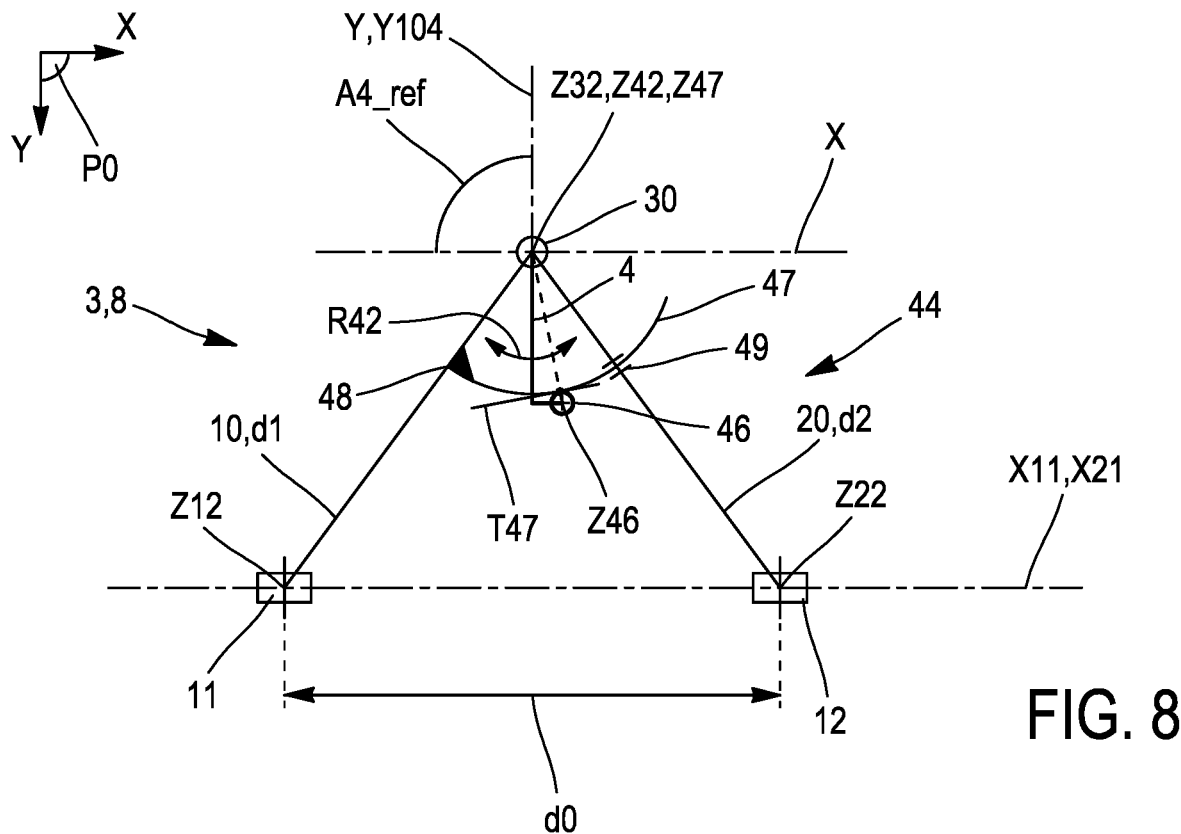
FIGS. 8 and 9 illustrate, by schematic bottom views, in a reference plane normal to the third pivot axis, the principle of operation of a compensating system which is used by the manipulator device of FIGS. 1 to 5 and which allows the absolute yaw orientation of the platform with respect to the pedestal to be retained during movements of the first and second carriages, said compensating system here using a toothed crown ring and a pinion associated with a yaw orientation motor.
Figure 9:
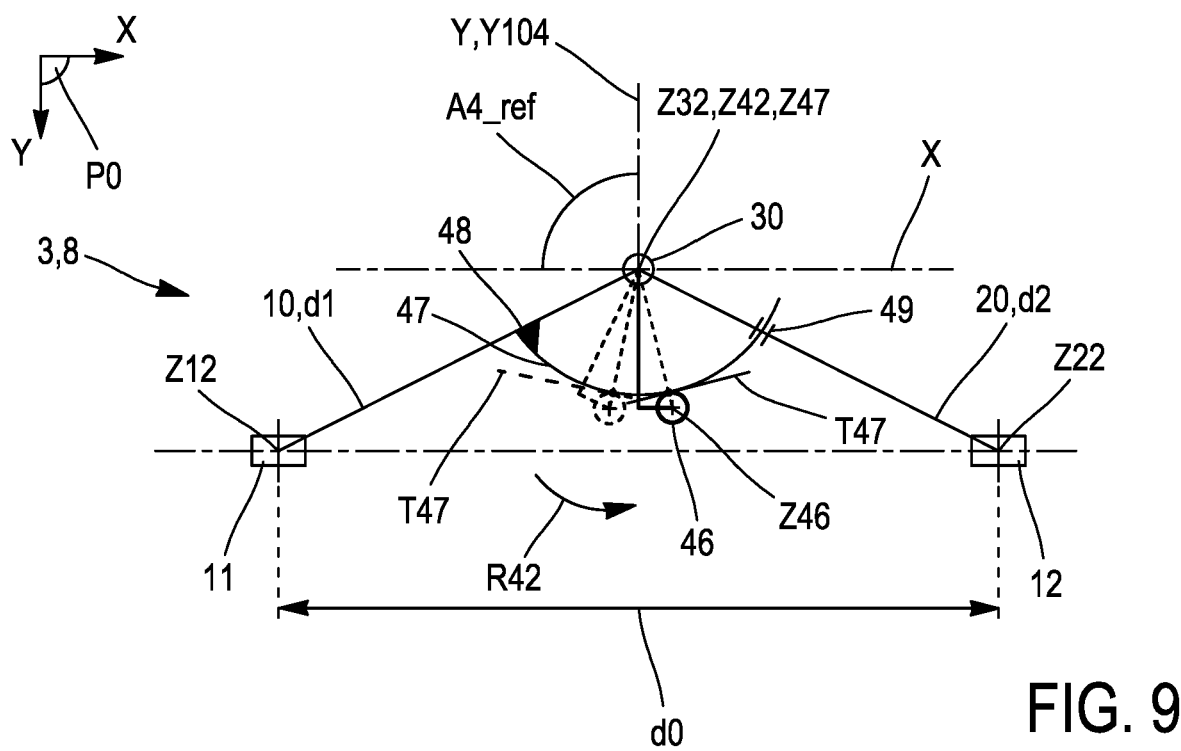

FIGS. 8, 9 and 10 give a better understanding of the phenomena of simple compensation, then of active reorientation, by fictitiously dissociating the corresponding phases.

Initially, the platform 4 is oriented according to the absolute reference orientation A4_ref, as is illustrated in FIG. 8.

According to a first phase, if the base center distance d0 is increased by moving the second carriage 21 away from the first carriage 11, as illustrated in FIG. 9, the angular aperture between the first and second arms 10, 20 is increased, which increases the arc length of the toothed crown ring portion 47 contained between these arms 10, 20.

Since the first arm 10 opens (here in clockwise direction in FIG. 9) with respect to the third pivot axis Z32, the point of the toothed crown ring 47 which was initially meshing with the pinion 46, and for which the distance to said first arm 10 is fixed because the toothed crown ring portion 47 is attached to said first arm 10, is therefore displaced in the same way. In the absence of activation, the yaw orientation motor 43 exerts a brake motor effect which opposes the rotation of the shaft of said motor, and therefore which opposes the rotation of the pinion 46, with respect to the stator of said motor fixed to the platform 4. That way, everything takes place as if the pinion 46 were then temporarily fixed in invariant position on the one hand on the platform 4, via the inactive yaw orientation motor 43 which temporarily blocks the rotation of the pinion 46 with respect to the stator of said motor and therefore with respect to the platform 4, and, on the other hand, with the toothed crown ring 47 on which the teeth of the pinion 46 mesh. Everything therefore takes place as if the toothed crown ring 47 "were pulling" on the pinion 46, by tilting said pinion 46 and the platform 4 following it.

If the tangent to the toothed crown ring 47 at the point of contact with the pinion 46, in the reference plane P0, is denoted T47, it can be seen that the tilting of the first arm 10 and therefore the yaw reorientation of the toothed crown ring 47 which results therefrom, has the effect of similarly tilting said tangent T47 by yaw, as is illustrated by dotted lines in FIG. 9.

During a second phase, which can in practice be applied simultaneously with or after the movement of the carriages 11, 21, the yaw orientation motor 43 is activated to provoke a rolling of the pinion 46 on the toothed crown ring 47. This rolling here covers the same arc length as that corresponding to the offset applied by the toothed crown ring 47 with respect to the second arm 20 during the first phase. The result of the combination of these phases is therefore an exact compensation of the rolling of the toothed crown ring 47 by the rolling of the pinion 46.

Finally, the yaw tilting of the first arm 10, of the seat 30 and of the toothed crown ring 47 by yaw with respect to the pedestal 2 is therefore compensated by an equivalent yaw tilting of the platform 4 with respect to the seat 30, which makes it possible to retain the absolute yaw orientation of said platform 4 during displacement of the seat 30, as can be seen by a solid line in FIG. 9. Here, the platform will therefore definitively remain oriented according to the chosen absolute yaw reference orientation A4_ref.

If necessary, during a third phase, it will be possible to activate the yaw orientation motor 43 in order for the pinion to describe, on the toothed crown ring 47, an additional displacement, so as to finally confer on the platform 4 an absolute yaw orientation which is distinct from the absolute yaw reference orientation A4_ref, and which therefore corresponds to an active angular reorientation by a value A_diff with respect to said reference orientation, as is illustrated in FIG. 10.

This active yaw reorientation will notably make it possible to position the object to be manipulated 5, and, here, more particularly a pressing roller 101, tangentially, in the reference plane P0, to the incurved receiving surface, which is here convex, and for example toroidal, of the assembly support 7.

It will also be noted that the toothed crown ring portion 47, the pinion 46, and at least a part of the platform 4 which forms a rocker beam which joins the yaw differential axis Z42 to the central axis Z46 of the pinion 46, are preferably situated on the side of the base of the articulated triangle 8, that is to say on the side of the guiding axis X11, X21 and of the corresponding gliding members 53, 54, with respect to the third pivot axis Z32, that is to say are contained between said third pivot axis Z32 and the guiding axis X11, X21, so as to be closer to the guiding axis X11, X21 than the third pivot axis Z32 is. This makes it possible to obtain, as already explained above, a compact structure and improve the rigidity of the carrying mechanism 3 by limiting the inertial effects and the deflection moments with respect to the guiding members 53, 54 used to guide the carriages 11, 21.

According to a preferential possible application, the manipulator device 1 will be used as cartesian robot for the manufacturing of reinforcing plies intended for the construction of tires, typically pneumatic tires.

Such reinforcing plies are produced, as is known per se, by juxtaposing strips 6 formed by at least one layer of rubber in which continuous longitudinal reinforcing wires are embedded, that are preferably metallic, and by butt-jointing said strips two-by-two by their respective selvedges, in order to progressively form a reinforcing ply, in which the reinforcing wires form a chosen angle, called "ply angle", with respect to the longitudinal direction of extension of said reinforcing ply.

Figure 2:
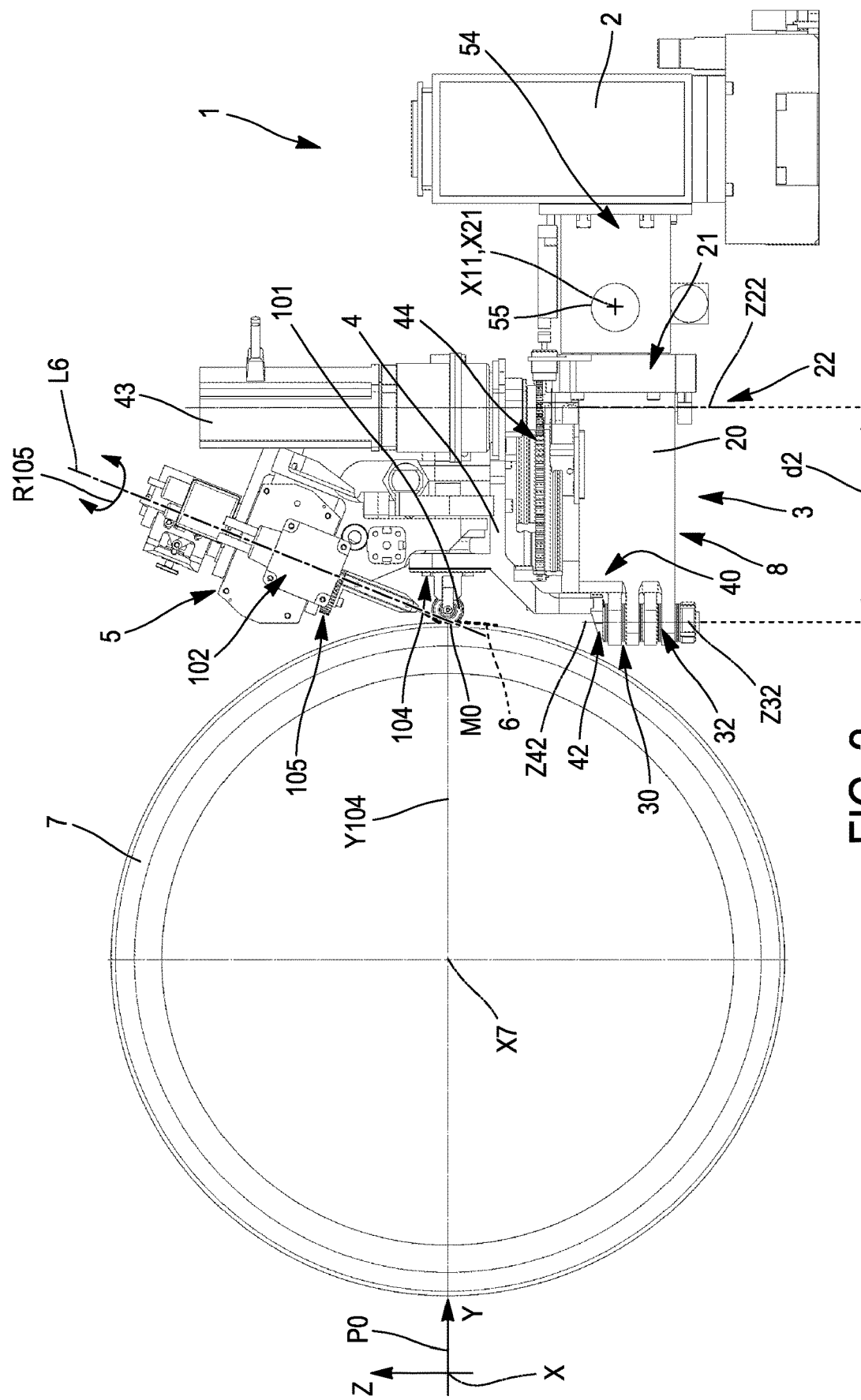
FIG. 2 illustrates, by a side overview, an installation for manufacturing reinforcing plies intended for the construction of tires, notably of pneumatic tires, said installation using the manipulator device of FIG. 1 to lay and butt-joint strips to one another on an assembly support which has a form of revolution, for example a toroidal form.

Thus, the disclosure relates in particular, as is illustrated in FIGS. 2 and 3, to an installation 100 for manufacturing reinforcing plies intended for the construction of tires, preferably of pneumatic tires, said installation 100 comprising an assembly support 7, such as a belt or a drum, and a laying tool 5 which is arranged to convey and successively layer strips 6 on the assembly support 7 by successively butt-jointing said strips 6 to one another by their respective selvedges, so as to progressively construct a reinforcing ply.

Said installation 100 comprises a manipulator device 1 according to the disclosure in which the platform 4 carries the laying tool 5, and in which the servocontrol module 50 is arranged to servocontrol one or more of the trajectories of said laying tool 5 which allow each strip 6 considered to be applied onto the assembly support 7.

Preferably, the assembly support 7 has a form of revolution about an axis called "assembly support axis" X7, for example a cylindrical form of circular base or, preferably, a toroidal form, here convex.

The manipulator device 1 is then preferably arranged so that the first carriage 11 and the second carriage 21 are guided on the pedestal 2 on one and the same rectilinear guiding axis X11, X21, which is parallel to the assembly support axis X7.

Thus, it is advantageously possible to lay the strips by conferring on the seat 30, and therefore on the platform 4 and on the laying tool 5, a simple movement transverse to the surface of the assembly support 7, oriented parallel to the assembly support axis X7.

Simultaneously, the assembly support 7 will be able to be driven in rotation about its axis X7, such that the combination of the rotation of the assembly support 7 and of the axial laying movement of the tool 5 results in laying the strips 6 according to a ply angle that will have been freely chosen, with respect to the longitudinal direction of the reinforcing ply currently being constructed.

The longitudinal direction of the ply will here correspond preferably here to the equator of the form of revolution of the assembly support 7, that is to say the hypothetical line defined by the intersection of the radially outer surface of said assembly support and an equatorial plane which is normal to the assembly support axis X7 and which axially divides said assembly support into two substantially, even exactly, symmetrical hemispheres. In practice, said equatorial plane passes preferably through the radially outermost point of the surface of the assembly support 7.

Preferably, the laying tool 5 comprises an applicator member 101, of the pressing roller kind, which is arranged to apply and press a strip 6 against the assembly support 7.

The pressing roller 101 is preferably arranged so that, when a strip 6 is located on said pressing roller 101, the visible surface of the strip 6, which comes into contact with the assembly support 7 under the pressure of the roller 101, is situated vertically in line with the third pivot axis Z32.

This advantageously makes it possible to make the yaw orientation of the platform 4, as decided and adjusted by the servocontrol module 50, coincide with the yaw orientation of the strip 6 with respect to the surface of the assembly support 7 during the laying. It is therefore easy to follow an assembly surface of any kind, including a curved or warped surface which requires the absolute yaw orientation of the pressing roller 101 to be dynamically modified to ensure a laying trajectory which is, at each of all of the points through which said laying trajectory successively passes, tangential to said surface of the assembly support 7.

Preferably, the laying tool 5 comprises an orientable mast 102, which is mounted on the platform 4 and which carries the applicator member 101.

The mast 102 also preferentially carries a feed module 103 arranged to convey the strips 6 to be laid to said applicator member 101, in a feed direction, here preferably rectilinear, which corresponds to the longitudinal direction L6 of the conveyed strips and which converge towards the applicator roller 101.

The feed module 103 can notably comprise an intake system 103A intended to produce or receive a continuous strip of rubber, reinforced with continuous longitudinal reinforcing wires, then a cutter 103B, allowing the continuous strip of rubber to be cut at defined longitudinal intervals, to generate the successive strips 6, and a dispensing spout 103C ensuring, for example by means of a row of rollers, the guiding of the strip 6 in the feed direction L6 and the exiting of the strip 6 onto the pressing roller 101.

Preferably, said mast 102 is provided with pitch tilting members 104, which are arranged so as to allow said mast 102, and thus the applicator member 101, to tilt by pitch with respect to the platform 4, about a pitch axis Y104.

Said pitch axis Y104, preferably horizontal, is preferentially contained in the reference plane P0 which is normal to the first, second and third pivot axes (Z12, Z22, Z32). The yaw orientation of said pitch axis Y104 thus corresponds to the yaw orientation of the platform 4. In particular, when the platform 4 is oriented according to its absolute yaw reference orientation A_ref, the pitch axis Y104 forms, with the abscissa axis X, in the reference plane P0, an angle equal to the value of said absolute yaw reference orientation A_ref, here, for example preferentially, an angle of 90 degrees in FIGS. 1, 9, 10.

Preferably, when the applicator member 101 is on the equatorial line of the surface of the assembly support 7, said pitch axis Y104 is at right angles to the assembly support axis X7, and therefore, here, parallel to the second main axis Y (the ordinate axis) of the absolute reference frame attached to the pedestal 2.

The presence of pitch tilting members 104 advantageously allows for a selection, and if necessary a reversal, of the orientation of the angle called "ply angle" by which it is wanted to incline the strip 6 considered, and therefore, more particularly, the longitudinal reinforcers of said strip 6, with respect to the longitudinal direction of the reinforcing ply currently being constructed on the assembly support.

It is thus possible to produce, by means of the same laying tool 5, either reinforcing plies with right-handed ply angle, or reinforcing plies with left-handed ply angle, that may be then superimposed to form crossed reinforcements in the crown zone of the pneumatic tire.

The pitch tilting members 104 will notably be able to comprise a ball bearing, by which the mast 102 is articulated on the platform 4 on the pitch axis Y104.

Said pitch axis Y104 preferably converges to the third pivot axis Z32.

The pressing roller 101 will advantageously be able to be mounted so as to be movable by translation along the pitch axis Y104, preferably disposed radially with respect to the assembly support 7, and be prestressed towards said assembly support 7, for example by means of a spring.

A pressing roller 101 thus suspended on a spring will notably make it possible to accommodate the thicknesses or variations of thickness of strips 6 and regulate the contact pressure with which the strips are applied against the assembly support 7

It will be noted that, preferably, the feed direction corresponding to the longitudinal direction L6 of the conveyed strips, the pitch axis Y104, and the third pivot axis Z32, are convergent and intersect at a point called "aiming point" MO situated on the surface of the assembly support 7, as can be seen in FIG. 3.

By virtue of this specific geometry, the servocontrol module 50 will advantageously be able to perfectly control, relatively simply on the different axes concerned, the laying trajectory and the conditions of laying of the strip 6 at the precise point where said strip 6 makes contact with the surface of the assembly support 7.

Moreover, the mast 102 will be able to comprise turn-up members 105 arranged to turn over the feed module 103, by rotation R105 about the feed direction corresponding to the longitudinal direction L6 of the conveyed strips 6.

Advantageously, it will thus be possible, when the strip 6 is cut slantwise by a cutting angle which corresponds to the target ply angle, to turn the strip 6 face upside down (and vice versa), and thus reverse the sign of said cutting angle, to adapt the sign of the cutting angle to the desired ply angle sign.

As can be seen in FIG. 1, the ply turn-up members 105 will for example be able to comprise a ply turn-up pinion 105A fixed to the feed module 103, and on which a rack 105B moved by a cylinder 105C meshes.

Obviously, the disclosure is no way limited to just the exemplary embodiments described in the above, the person skilled in the art being notably able to isolate or freely combine together one or other of the abovementioned features, or replace them with equivalents.

What is claimed is:

1. A manipulator device comprising a pedestal and a carrying mechanism which is supported by said pedestal and which carries a platform intended to receive an object to be manipulated, such as a tool, said manipulator device being wherein the carrying mechanism forms an articulated triangle which comprises:
    a first arm which is borne by a first carriage guided in translation on the pedestal, and which is articulated with said first carriage on a first pivot link about a first pivot axis which forms a first vertex of articulated triangle,
    a second arm which is borne by a second carriage, distinct from the first carriage and guided in translation on the pedestal, and which is articulated with said second carriage on a second pivot link about a second pivot axis, which is parallel to the first pivot axis and forms a second vertex of the articulated triangle,
    a seat, which offers a support to the platform and which corresponds to an intersection of the first arm and of the second arm, an intersection at which said first and second arms are articulated with respect to one another on a third pivot link, about a third pivot axis which is parallel to the first pivot axis and to the second pivot axis and which forms a third vertex of the articulated triangle,
    a servocontrol module which controls, on the one hand, a first motor, specific to the first carriage, and, on the other hand, a second motor, specific to the second carriage and distinct from the first motor, so as to be able to distinctly servocontrol the respective translational movements of the first carriage and the second carriage with respect to the pedestal, in order to be able to modify the position of the seat with respect to the pedestal, a yaw-orientation interface which comprises a fourth pivot link, called "yaw differential pivot", by which the platform is articulated on the seat, both relative to the first arm and relative to the second arm, by a yaw rotational movement called "yaw differential movement", about a fourth pivot axis called "yaw differential axis" which is coaxial to the third pivot axis.

2. The manipulator device according to claim 1, wherein the yaw orientation interface comprises a compensating system which is arranged to cooperate with the yaw differential pivot so as, on the one hand, to confer on the platform, in a reference frame attached to the pedestal, called "absolute reference frame", a determined yaw angular orientation about the yaw differential axis coaxial to the third pivot axis, called "absolute yaw reference orientation", and, on the other hand, to be able to automatically keep the platform in this absolute yaw reference orientation with respect to the pedestal, in said absolute reference frame attached to the pedestal, during displacements of the first carriage and/or of the second carriage which modify the distance, called "base center distance", which separates the first pivot axis from the second pivot axis.

3. The manipulator device according to claim 2, wherein the servocontrol module takes for reference, to define an origin from which said servocontrol module controls the yaw orientation motor and quantifies the yaw differential movements generated by the activation of said yaw orientation motor, the configuration that said yaw orientation motor has when the platform is oriented in accordance with the absolute yaw reference orientation.

4. The manipulator device according to claim 1, wherein the yaw orientation interface comprises a yaw orientation motor, which is controlled by the servocontrol module and which is arranged so as to, when said yaw orientation motor is activated, drive the platform by the yaw differential movement, about the yaw differential axis, with respect to the first and second arms.

5. The manipulator device according to claim 1, wherein the yaw orientation interface comprises, on the one hand, a toothed, circular crown ring portion, which is centered on the third pivot axis and which links the first arm to the second arm by being fixed in an invariant position on the first arm and slidingly guided on the second arm at a fixed radial distance from the third pivot axis, so as to be able to accommodate the angular separation or angular convergence displacement of the first and second arms induced by the displacements of the first carriage and/or of the second carriage, and, on the other hand, a pinion, which meshes on said toothed crown ring portion, and which is coupled to a yaw orientation motor, which is itself embedded on the platform, such that it is possible to selectively control the yaw orientation interface by choosing from among a plurality of distinct operating regimes comprising:

a first operating regime, called "simple compensation regime", in which the yaw orientation motor is activated to an extent that is just necessary and sufficient for the rolling meshing of the pinion on the toothed crown ring portion to ensure that the absolute yaw orientation of said platform with respect to the pedestal is maintained, by thus producing a compensation of the movements of the first and second arms which are induced by the displacement of one and/or the other of the first and second carriages;

a second operating regime, called "active reorientation regime", in which the yaw orientation motor is activated so as to drive the pinion to an extent such that the rolling meshing of the pinion on the toothed crown ring portion provokes an active modification of the absolute yaw orientation of the platform with respect to the pedestal.

6. The manipulator device according to claim 1, wherein the servocontrol module contains at least one control law which is designed to control an acceleration of the seat, said acceleration being considered in a reference plane which is normal to the first, second and third pivot axes, and at a point called "seat center" which corresponds to the intersection of the third pivot axis with said reference plane, and in that said control law allows said acceleration of the seat to be defined from an expression of degree N with respect to time, with N being an integer equal to or greater than 1, and preferably at least of the second degree with respect to time, even of the third degree with respect to time or of a degree greater than three.

7. The manipulator device according to claim 1, wherein the first carriage is guided in rectilinear translation with respect to the pedestal on a first guiding axis which is at right angles to the first pivot axis, and in that the second carriage is guided in rectilinear translation with respect to the pedestal on a second guiding axis which is parallel to the first guiding axis, and preferentially which is coaxial to said first guiding axis.

8. The manipulator device according to claim 1, wherein the first carriage and the second carriage respectively form a first coil pack of a first linear motor and a second coil pack of a second linear motor, distinct from the first linear motor, and in that the first and second coil packs of said first and second linear motors are engaged on one and the same common magnetic bar, which is fixed onto the pedestal and which embodies a guiding axis shared by the first carriage and the second carriage.

9. The manipulator device according to claim 1, wherein the distance which separates the first pivot axis from the third pivot axis, called "first centre distance" (d1), and the distance which separates the second pivot axis from this same third pivot axis, called "second center distance", are invariant, and preferably are equal such that the articulated triangle is an isosceles triangle.

\* \* \* \* \*